(12) United States Patent
Sultenfuss et al.

(10) Patent No.: US 10,444,815 B1
(45) Date of Patent: Oct. 15, 2019

(54) VARIABLE BATTERY POWER OUTPUT FOR HIGH RESOLUTION DISPLAY PANELS

(71) Applicant: Dell Products L.P., Round Rock, TX (US)

(72) Inventors: Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/134,457

(22) Filed: Sep. 18, 2018

(51) Int. Cl.
  *G06F 1/32* (2019.01)
  *G09G 3/36* (2006.01)
  *G06F 1/16* (2006.01)
  *G02F 1/1335* (2006.01)
  *G06F 1/3218* (2019.01)
  *G06F 1/3296* (2019.01)

(52) U.S. Cl.
  CPC ...... *G06F 1/3218* (2013.01); *G02F 1/133611* (2013.01); *G06F 1/1635* (2013.01); *G06F 1/3296* (2013.01); *G09G 3/36* (2013.01); *G09G 2320/0626* (2013.01); *G09G 2330/02* (2013.01)

(58) Field of Classification Search
  CPC ........................................................ G06F 1/26; G06F 1/263; G06F 1/266; G09G 2330/00; G09G 2330/021; G09G 2360/08
  See application file for complete search history.

(56) References Cited

U.S. PATENT DOCUMENTS

| | | | |
|---|---|---|---|
| 9,300,015 B2* | 3/2016 | Chang | G06F 1/263 |
| 2011/0163602 A1* | 7/2011 | Joo | G06F 1/263 |
| | | | 307/66 |
| 2017/0038894 A1* | 2/2017 | Jeong | G06F 3/0416 |
| 2018/0048848 A1* | 2/2018 | Park | G06F 1/26 |

* cited by examiner

*Primary Examiner* — Dong Hui Liang
(74) *Attorney, Agent, or Firm* — Baker Botts L.L.P.

(57) ABSTRACT

Systems and methods for supplying electrical power to a display device of an information handling system (IHS) include obtaining characteristics of the display device, including device type, obtaining characteristics of an internal battery of the IHS, including native output voltage, and selecting, based on the obtained characteristics, DC power output by the internal battery (when the display is a standard or HD display) or a DC power output of an external boost control structure coupled to the IHS (when the display is a UHD or QHD display) as the electrical power to be supplied to the display device. The external boost control structure may boost the native voltage of the DC power output by the internal battery to a higher voltage. Electrical power from the selected source is supplied to the display device and electrical power from the internal battery is supplied to other components of the IHS.

20 Claims, 3 Drawing Sheets

VARIABLE BATTERY POWER OUTPUT FOR HIGH RESOLUTION DISPLAY PANELS

BACKGROUND

Field of the Disclosure

This disclosure relates generally to information handling systems and, more particularly, to variable battery power outputs for high resolution display panels.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as laptop computers, notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

Display devices, such as liquid crystal displays (LCDs) are commonly integrated within portable information handling systems configured in the form of laptop, notebook, netbook, and tablet computers, among others, and personal mobile devices, such as smart phones. Desktop or non-portable information handling systems also use display devices, which are often implemented as separate devices with input ports for graphical display signals. LCD displays consume much, if not most, of the power consumed in such information handling systems, the vast majority of which is consumed by the backlighting elements used by the LCD screens.

SUMMARY

In one aspect, a disclosed information handling system includes a display device, an internal battery, an interface through which an external boost control structure is coupled to the information handling system, a processor, and non-transitory computer readable memory media. The non-transitory computer readable memory media stores instructions executable by the processor for obtaining first information indicating one or more characteristics of the display device, including a type of the display device, obtaining second information indicating one or more characteristics of the internal battery, including a native voltage of direct current (DC) power output by the internal battery, and selecting, based on the first and second information, a source of electrical power to be supplied to the display device. The selecting includes selecting the DC power output by the internal battery as the electrical power to be supplied to the display device, or selecting a DC power output of the external boost control structure as the electrical power to be supplied to the display device, the DC power output of the external boost control structure being supplied at a higher voltage than the native voltage of the DC power output by the internal battery. The instructions are further executable by the processor for initiating the supply of electrical power from the selected source of electrical power to the display device and for initiating the supply of electrical power from the internal battery to one or more components of the information handling system other than the display device.

In any of the disclosed embodiments, the external boost control structure may be removably coupled to the information handling system.

In any of the disclosed embodiments, the external boost control structure may be implemented in an external charger that further comprises circuitry for charging the internal battery.

In any of the disclosed embodiments, to supply the DC power output at a higher voltage than the native voltage of the DC power output by the internal battery, the external boost control structure may be configured to receive electrical power from the internal battery at the native voltage and boost the voltage of the received electrical power to the higher voltage.

In any of the disclosed embodiments, the type of the display device may be an ultra-high-definition liquid crystal display (LCD) device or a quad-high-definition LCD display device, and selecting the source of electrical power to be supplied to the display device may include selecting the DC power output of the external boost control structure as the electrical power to be supplied to the display device.

In any of the disclosed embodiments, the type of the display device may be a standard-definition liquid crystal display (LCD) device or a high-definition LCD display device and selecting the source of electrical power to be supplied to the display device may include selecting the DC power output by the internal battery as the electrical power to be supplied to the display device.

In any of the disclosed embodiments, the instructions may be further executable by the processor for determining, based on the first and second information, the higher voltage at which the DC power output of the external boost control structure is supplied to the display device.

In any of the disclosed embodiments, the higher voltage at which the DC power output of the external boost control structure is supplied to the display device may be lower than an operating voltage of the display device, and the display device may include an internal boost structure configured to boost the higher voltage at which the DC power output of the external boost control structure is supplied to the display device to the operating voltage of the display device.

In any of the disclosed embodiments, the first information may further include at least one of a battery temperature, a battery state, number of cells, a battery topology, a battery state-of-charge, a battery state of health, a battery age, and a battery size, and the second information may further include at least one of a display panel type, a display panel operation state, a backlight setting, a brightness setting, a resolution setting, and a number of display panels.

In any of the disclosed embodiments, the information handling system may further include a data store, and at least some of the first information and the second information may be obtained from the data store.

In another aspect, a disclosed method is for supplying electrical power to a display device of an information handling system. The method includes obtaining first information indicating one or more characteristics of the display device, including a type of the display device, obtaining second information indicating one or more characteristics of an internal battery of the information handling system, including a native voltage of direct current (DC) power output by the internal battery, and selecting, based on the first and second information, a source of electrical power to be supplied to the display device. The selecting includes selecting the DC power output by the internal battery as the electrical power to be supplied to the display device, or selecting a DC power output of an external boost control structure coupled to the information handling system as the electrical power to be supplied to the display device, the DC power output of the external boost control structure being at a higher voltage than the native voltage of the DC power output by the internal battery. The method further includes supplying electrical power from the selected source of electrical power to the display device and supplying electrical power from the internal battery to one or more components of the information handling system other than the display device.

In any of the disclosed embodiments, the method may further include receiving, by the external boost control structure from the internal battery, DC power at the native voltage of the DC power output by the internal battery, and boosting, by the external boost control structure, the native voltage of the DC power output by the internal battery to the higher voltage.

In any of the disclosed embodiments, the type of the display device may be an ultra-high-definition liquid crystal display (LCD) device or a quad-high-definition LCD display device, and selecting the source of electrical power to be supplied to the display device may include selecting the DC power output of the external boost control structure as the electrical power to be supplied to the display device.

In any of the disclosed embodiments, the type of the display device may be a standard-definition liquid crystal display (LCD) device or a high-definition LCD display device, and selecting the source of electrical power to be supplied to the display device comprises selecting the DC power output by the internal battery as the electrical power to be supplied to the display device.

In any of the disclosed embodiments, the method may include determining, based on the first and second information, the higher voltage at which the DC power output of the external boost control structure is supplied to the display device.

In any of the disclosed embodiments, the higher voltage at which the DC power output of the external boost control structure is supplied to the display device may be lower than an operating voltage of the display device, and the method may further include boosting the higher voltage at which the DC power output of the external boost control structure is supplied to the display device to the operating voltage of the display device.

In any of the disclosed embodiments, at least some of the first information or the second information may be obtained from a data store of the information handling system.

In yet another aspect, a disclosed non-transitory computer readable memory media stores instructions executable by a processor for obtaining first information indicating one or more characteristics of a display device of an information handling system, including a type of the display device, obtaining second information indicating one or more characteristics of an internal battery of the information handling system, including a native voltage of direct current (DC) power output by the internal battery, and selecting, based on the first and second information, a source of electrical power to be supplied to the display device. The selecting includes selecting the DC power output by the internal battery as the electrical power to be supplied to the display device, or selecting a DC power output of an external boost control structure coupled to the information handling system as the electrical power to be supplied to the display device, the DC power output of the external boost control structure being at a higher voltage than the native voltage of the DC power output by the internal battery. The program instructions are further executable by the processor for initiating the supply of electrical power from the selected source of electrical power to the display device, and for initiating the supply of electrical power from the internal battery to one or more components of the information handling system other than the display device.

In any of the disclosed embodiments, when the type of the display device is an ultra-high-definition liquid crystal display (LCD) device or a quad-high-definition LCD display device, selecting the source of electrical power to be supplied to the display device comprises selecting the DC power output of the external boost control structure as the electrical power to be supplied to the display device, and when the type of the display device is a standard-definition liquid crystal display (LCD) device or a high-definition LCD display device, selecting the source of electrical power to be supplied to the display device comprises selecting the DC power output by the internal battery as the electrical power to be supplied to the display device.

In any of the disclosed embodiments, the instructions are further executable by the processor for determining, based on the first and second information, the higher voltage at which the DC power output of the external boost control structure is supplied to the display device.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

In different embodiments, information handling systems may include different battery pack topologies. For example, for particular platforms, different decisions may be made about which of a variety of battery architectures (e.g., which of a variety of S topologies should be implemented in the information handling systems. In some cases, the battery packs of particular platforms may be configured in a manner that is optimized for system power consumption for certain applications and/or operating contexts. Some battery pack configurations may be well suited for use in systems that include particular types of display devices but may be less well suited for use in systems that, while similar in other ways, include different types of display devices. For example, different information handling systems may include display devices having different display panel resolutions and, based on the panel resolutions, the power consumption of the display panels may be a relatively low percentage of the total power consumed by the information handling system or may be a much higher percentage of the total power consumed by the information handling system.

As will be described in further detail, the inventors of the present disclosure have developed methods and systems disclosed herein for providing a variable battery power output for high resolution display panels of an information handling system, while supplying power from an internal battery to some or all of the remaining components of the information handling system.

Figure 1:
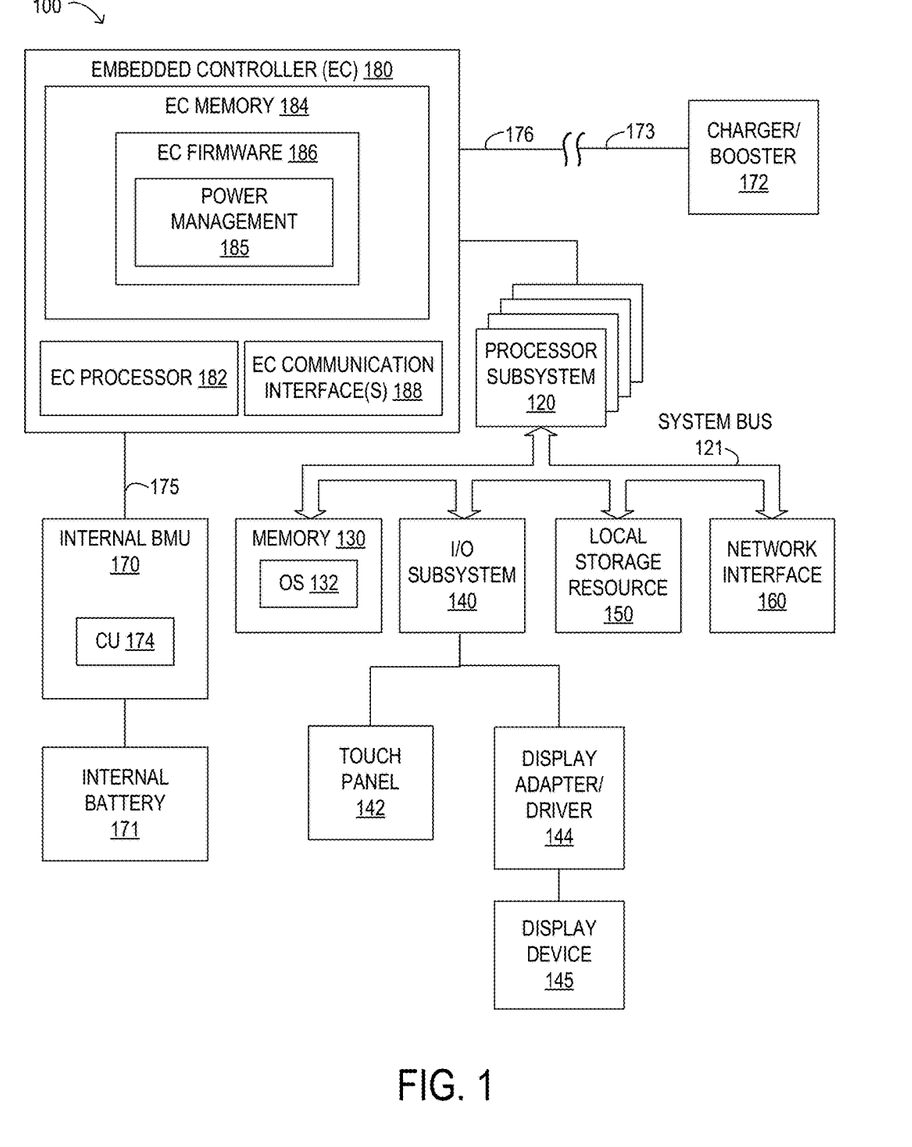
FIG. 1 is a block diagram of selected elements of an embodiment of an information handling system.
Figure 2:
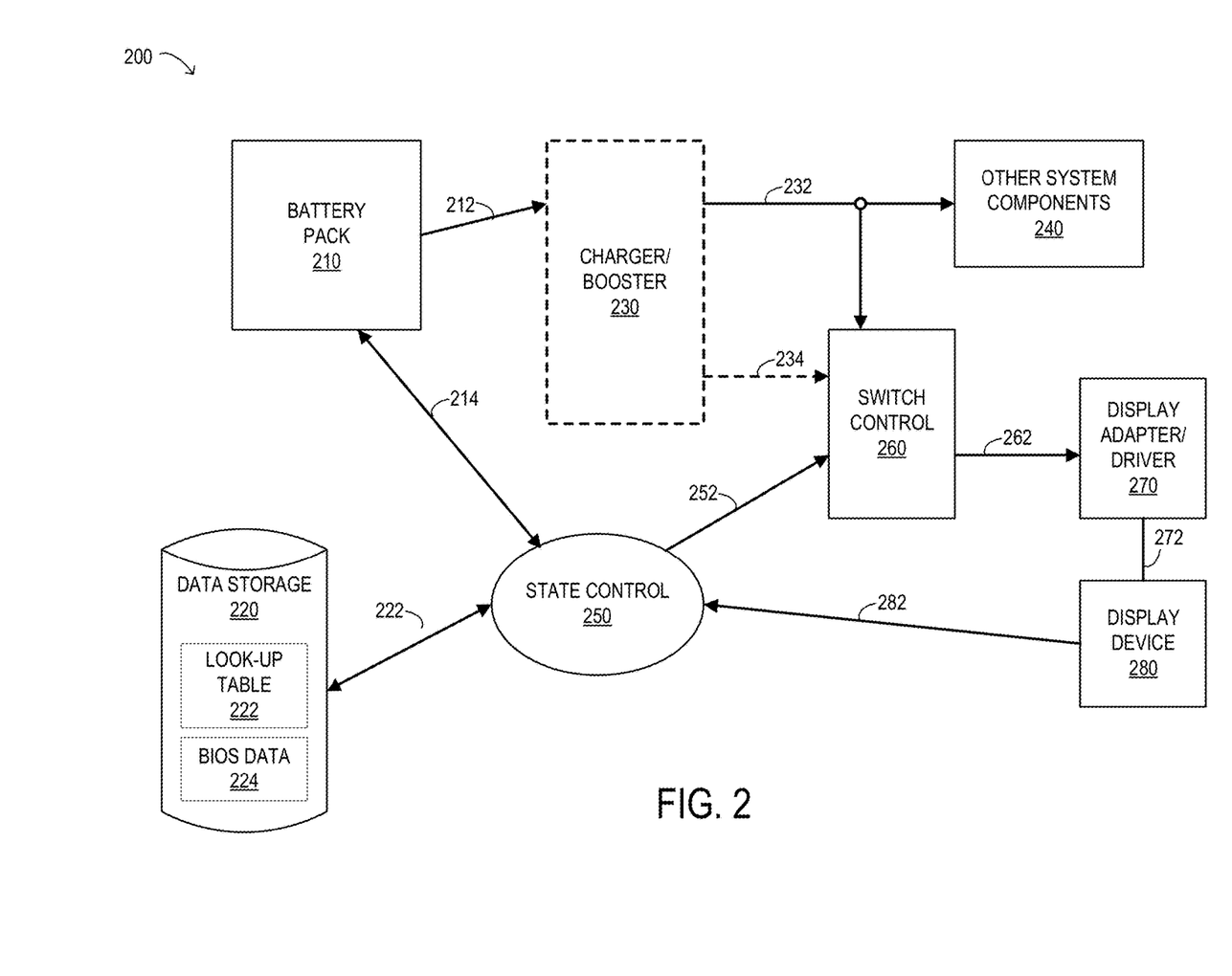
FIG. 2 is a block diagram illustrating interactions between selected elements of an embodiment of an information handling system that provides a variable battery power output for high resolution display panels.
Figure 3:
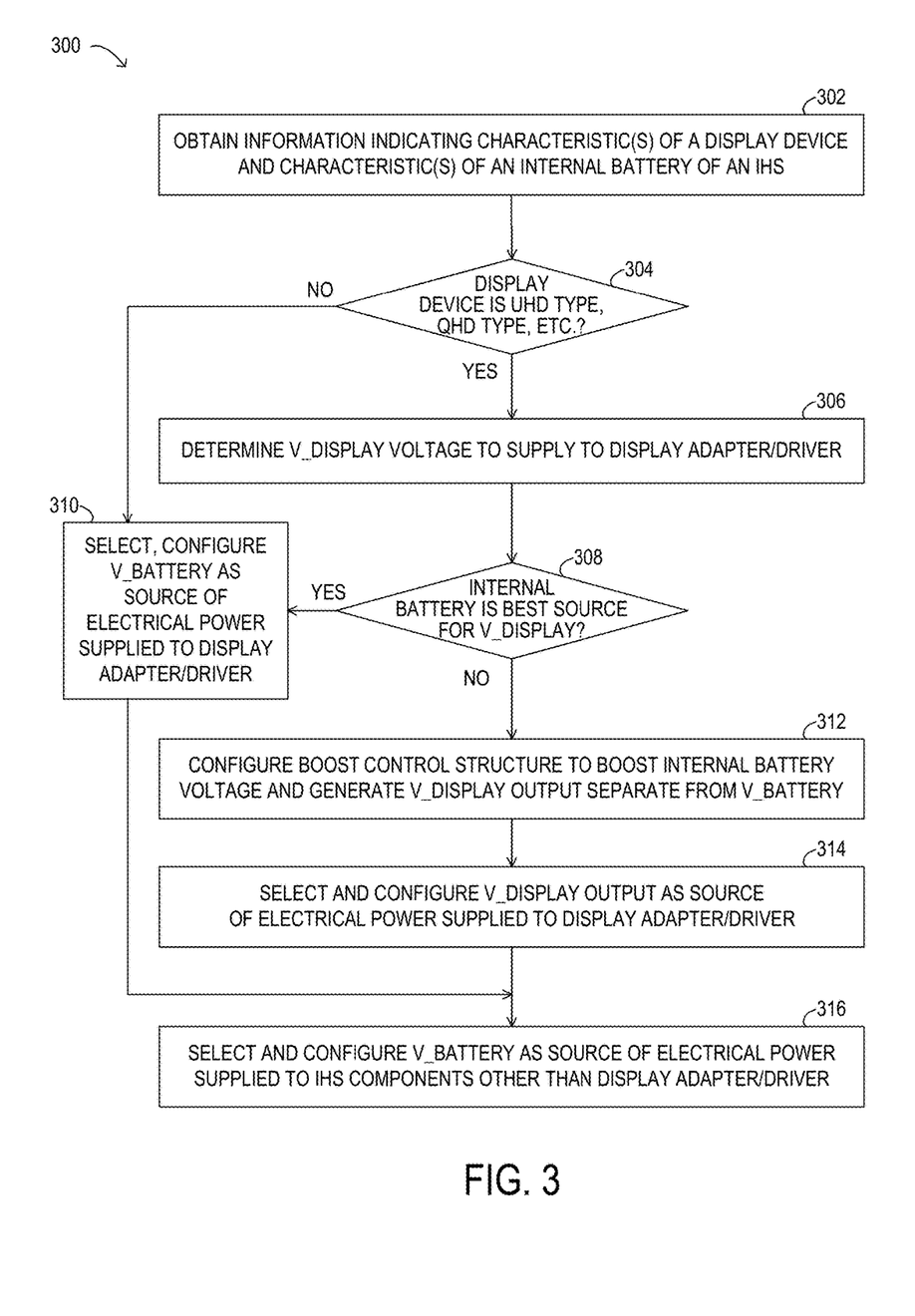
FIG. 3 is flowchart depicting selected elements of an embodiment of a method for providing a variable battery power output for high resolution display panels.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of portable information handling system 100. It is noted that FIG. 1 is not drawn to scale but is a schematic illustration. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Internal battery 171 may be a rechargeable battery. As illustrated in FIG. 1, in some embodiments, information handling system 100 may be removably coupled to an external charger/booster 172.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, some of which may be physically integrated within information handling system 100. As shown in FIG. 1, I/O subsystem 140 may comprise a touch panel 142 and a display adapter/driver 144 among other elements. Touch panel 142 may include circuitry for enabling touch functionality in conjunction with a display device, shown as display device 145, that is driven by display adapter/driver 144. Display adapter/driver 144 may include processing capability to receive display data and generate corresponding control signals to drive display device 145. In other embodiments, I/O subsystem 140 may include more, fewer, or different input/output devices or components. For example, in some embodiments, I/O subsystem 140 may include a keyboard, an accelerometer, a touch pad, a gyroscope, and/or a camera (such as a video camera, infrared camera, or other imaging devices or combinations thereof), among other examples. In some implementations, I/O subsystem 140 may support so-called 'plug and play' connectivity to external devices, in which the external devices may be added or removed while portable information handling system 100 is operating.

Display device 145 may be implemented in a fixed resolution corresponding to a number of pixels included within a display panel and may be implemented using various types of display technology, including, but not limited to, light-emitting diodes (LED), liquid crystal displays (LCD), plasma displays, etc. In some embodiments, display device 145 may include an actively illuminated element, such as a backlight. In various embodiments of information handling system 100, such as portable devices or so-called all-in-one devices, display device 145 may be mechanically integrated with other components. Furthermore, touch panel 142 may be integrated into display device 145 such that a touch user interface is provided to a user. The touch user interface typically coincides with a pixel space of display device 145 such that touch inputs correspond to certain display pixels, which may present user interface elements, such as buttons, menus, input fields, etc., to the user.

In particular embodiments, embedded controller 180 may support one or more power busses 176 that carry and distribute electrical power to and from portable information handling system 100. In some embodiments, power bus 176 may represent a data bus that also carries and distributes electrical power to and from portable information handling system 100. For example, a DC power input 173 received from an external charger/booster 172 may be routed via a DC power connection 175 to BMU 170 for purposes of charging internal battery 171 or otherwise powering portable information handling system 100. In various embodiments, power bus 176 may represent a variable power bus that supports different levels of direct current (DC) power that may be provided to certain peripherals connected to I/O subsystem 140, including display adapter/driver 144 and/or display device 145.

In certain embodiments, a variable power bus 176 may be implemented according to an industry standard, such as a Universal Serial Bus (USB), which is developed and supported by the USB Implementers Forum, Inc. (USB IF). In particular, a variable power bus 176 may be implemented as a USB Type-C bus that may support different USB devices, such as USB Type-C devices with USB Type-C connectors. For example, in some embodiments, charger/booster 172 may include a USB Type-C connector. Accordingly, a variable power bus 176 may support device detection, interface configuration, communication, and power delivery mechanisms according to the USB Type-C standard. The USB Type-C connector system allows the transport of data and electrical power (in the form of DC power) between various USB devices that are connected using USB Type-C ports and USB Type-C connectors. A USB device may be an information handling system, a peripheral device, or a power device, among other types of USB devices, and may support more than one USB standard or generation, such as USB 1.0, USB 2.0, USB 3.0, USB 3.1, or other versions. Furthermore, USB devices may also support one or more types of physical USB ports and corresponding connectors (i.e., receptacles and plugs), such as Type-A, Type-A SuperSpeed, Type-B, Type-B SuperSpeed, Mini-A, Mini-B, Micro-A, Micro-B, Micro-B SuperSpeed, and Type-C (also referred to as USB Type-C herein), among other variants. In one example, USB 3.1 Type-C cables may provide electronic functionality using an integrated semiconductor device with an identification function based on a configuration data channel and vendor-defined messages (VDMs) from a USB Power Delivery specification published by USB IF. Examples of source power rules governed by the USB Power Delivery Specification, revision 2.0, version 1.2 are given in Table 1 below.

TABLE 1

USB Power Delivery revision 2.0, version 1.2 source power rules.

| Source Output Power [W] | Current [A] at +5 V DC | Current [A] at +9 V DC | Current [A] at +15 V DC | Current [A] at +20 V DC |
|---|---|---|---|---|
| 0.5 to 15 | 0.1 to 3.0 | none | none | none |
| 15 to 27 | 3.0 (15 W limit) | 1.7 to 3.0 | none | none |
| 27 to 45 | 3.0 (15 W limit) | 3.0 (27 W limit) | 1.8 to 3.0 | none |
| 45 to 60 | 3.0 (15 W limit) | 3.0 (27 W limit) | 3.0 (45 W limit) | 2.25 to 3.0 |
| 60 to 100 | 3.0 (15 W limit) | 3.0 (27 W limit) | 3.0 (45 W limit) | 3.0 to 5.0 |

As shown in Table 1, USB Power Delivery defines four standardized voltage levels (+5V DC, +9V DC, +15V DC, and +20V DC), while power supplies may provide electrical power from 0.5 watts to 100 watts.

A USB device, such as a USB Type-C device, may provide multiple power ports that can individually transfer power in either direction and may accordingly be able to operate as a power source device, a power sink device, or both (dual-role power device). A USB device operating as a dual-role power device may operate as a power source or a power sink depending on what kinds of other USB devices are connected. In addition, each of the multiple power ports provided by the USB device may be a dual-role power port that is able to operate as either a power source port or a power sink port. For example, a USB Type-C bus, such as variable power bus 142, may support power delivery from a power source port of a power source USB device to a power sink port of a power sink USB device, while simultaneously supporting bidirectional USB data transport. The power source port of the power source USB device and the power sink port of the power sink USB device form a power port pair. Each of the other power ports provided by the USB device may form other power port pairs of other USB dual-role power devices.

According to the USB Power Delivery Specification, USB Type-C devices may perform a negotiation process to negotiate and establish a power contract for a particular power port pair that specifies a level of DC power that is transferred using USB. For example, a USB Type-C device may negotiate a power contract with another USB device for a level of DC power that is supported by a power port pair of both devices, where one power port is a power source port of the USB Type-C device and the other power port is a power sink port of the other USB device. The power contract for power delivery and consumption may represent an agreement reached between the power source device and the power sink device for the power port pair. While operating in Power Delivery mode, the power contract for the power port pair will generally remain in effect unless altered by a re-negotiation process, a USB soft reset, a USB hard reset, a removal of power by a power source, a failure of the power source, or a USB role swap (such as between power source and power sink devices), as specified in detail by USB IF. When a particular power contract is in place, additional power contracts can be established between another power port of the power source device and a power port of another power sink device.

According to the USB Power Delivery specification, the negotiation process may begin with the power source device detecting an attachment of a USB device operating as a power sink to a power port of the power source device. In response to the detection of the attachment at the respective USB ports, the power source device may communicate a set of supported capabilities including power levels, voltage levels, current levels, and direction of power flow of the power port of the power source device by sending the set of supported capabilities to the power sink over the USB connection. In response to receiving the set of supported capabilities, the power sink device may request one of the communicated capabilities by sending a request message to the power source device. In response to receiving the request message, the power source device may accept the request by sending an accept message and by establishing a power source output corresponding to the request. The power contract for the power port pair may be considered established and in effect when the power source device sends the accept message to the power sink device, which ends the negotiation process. A re-negotiation process may occur in a similar manner when a power contract is already in effect.

During the negotiation process, a power sink USB device that may be unable to fully operate at any of the communicated capabilities may request a default capability but indicate that the power sink USB device would prefer another power level. In response to receiving the default capability request, the power source device may accept the default capability request by storing the power sink USB device's preferred power level, sending an accept message, and by establishing a power source output corresponding to the default capability request.

During the various negotiation processes described above for USB Power Delivery, the negotiation may fail when a request is not accepted, and may result in no power contract being established. For example, the power sink USB device and the power source USB device may have timeouts for pending requests, or other communications, to a respective counterparty. When a counterparty does not respond within the timeout, a pending request or other communication may fail. It is also noted that in some embodiments, a power delivery contract for zero electrical power may be established, such that no power is transferred but the power port pair remains connected over the USB connection.

In certain embodiments, a power bus 176 may receive a DC power input 173 through a connector other than a USB type connector. For example, a charger/booster 172 or another power source, such as a DC power adapter (not shown in FIG. 1), may include a barrel-type connector, a Lightning™ connector developed by Apple, Inc., or a Thunderbolt™ connector developed by Apple, Inc., among other connector types.

Also shown in FIG. 1 embedded controller (EC) 180 may include EC processor 182 as a second processor included within portable information handling system 100 for certain management tasks, including supporting communication and providing various functionality with respect to BMU 170. Thus, EC processor 182 may have access to EC memory 184, which may store EC firmware 186, representing instructions executable by EC processor 182. As shown, EC firmware 186 includes power management 185, which may represent executable code for controlling various operating parameters of internal battery 170 and/or for selecting and initiating the supply of a variable battery power output for high resolution display panels, as disclosed herein.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

In the illustrated embodiment, embedded controller 180 may be responsible for managing electrical power connections between internal or external power sources and other portions of portable information handling system 100. In other embodiments, power control may be implemented by a separate power controller external to embedded controller 180. For example, a power bus 176 may supply electrical power to portable information handling system 100, in which case embedded controller 180, or a separate power controller, may determine whether the electrical power is used to charge internal battery 171 or to directly power portable information handling system 100 or particular components thereof. In another example, embedded controller 180, or a separate power controller, may be configured to determine whether to supply electrical power supplied over power bus 176 (e.g., from charger/booster 172) or electrical power supplied by internal battery 171 to particular components of portable information handling system 100, such as display adapter/driver 144 and/or display device 145. In yet another example, embedded controller 180, or a separate power controller, may manage so-called 'soft start up' of portable information handling system 100, such as when portable information handling system 100 awakes from a low power state, such as sleep mode, by determining a source of power during the low power state and managing operation of portable information handling system 100 during the low power state.

In the illustrated embodiment, DC power and control 175 may represent suitable connections between embedded controller 180 and BMU 170, for example. This may include connections for providing data obtained from internal battery 171 (e.g., temperature, battery state, battery topology, battery state-of-charge (SOC), battery state of health (e.g., age), battery size, etc.), which may serve as inputs for selecting and providing a variable battery power output for high resolution display panels, as disclosed herein. Other inputs for selecting and providing a variable battery power output for high resolution display panels (e.g., panel type, panel operation state, backlight or brightness settings, resolution settings, etc.) may be received from display adapter/driver 144 and/or display device 145. In some embodiments, selecting and providing a variable battery power output for high resolution display panels may also be dependent on an operating context of the information handling system and/or on the active applications that are currently executing on the information handling system or that are expected to be executing on the information handling system. It is noted that in some embodiments, at least certain portions of the methods for selecting and providing a variable battery power output for high resolution display panels described herein may be implemented using EC firmware 186, such as specialized executable instructions for power management and control.

As illustrated in FIG. 1, portable information handling system 100 may include a battery management unit (BMU) 170 that controls operation of internal battery 171. In particular implementations, BMU 170 may be embedded within a respective battery whose operation BMU 170 controls. For example, BMU 170 within portable information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. For example, internal battery 171 may include three or more cells in various configurations including, but not limited to, 2S-1P, 2P-2S, 2S-3P, 3S-1P, 3S-2P, 3S-4P, 4S, 4S-2P, 4S-3P, 4S-4P, and 4P, in different embodiments. In some embodiments, internal battery 171 may include one or more cells based on any one of a variety of Lithium-ion electrochemistries, or one or more cells based a different electrochemistry than Lithium-ion.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. One or more temperature sensors may be located in proximity to the battery cells to provide accurate indications of the temperature at different locations within battery 171. The fuse may be a safety element for limiting current flowing through the main power circuit. The power switch may be an electronically controlled switching element that closes or opens the main power circuit, and thereby allows the battery to operate for charging or discharging.

As shown in FIG. 1, a charger/booster 172 may be designed to couple to portable information handling system 100 using a power bus 176. For example, a power bus 176 may include power connections for electrically coupling charger/booster 172 to portable information handling system 100 as an external load on charger/booster 172. In certain embodiments, a power bus 176 may be a variable power bus that also includes a communication link to enable a charger/booster 172 to communicate with portable information handling system 100. For example, charger/booster 172 may communicate power delivery capabilities of the charger/booster 172 to portable information handling system 100 over a communication link within a variable power bus 176. In other embodiments, there may be a communication link between charger/booster 172 and portable information handling system 100 that is separate from any power bus 176 instead of, or in addition to, a communication link that is part of a variable power bus 176. In some embodiments, a communication link between charger/booster 172 and portable information handling system 100 may operate in accordance with a System Management Bus (SMBus) protocol for sending and receiving data. As noted above, in particular embodiments, a variable power bus 176 may be compatible with USB Type-C and may be implemented according to USB Type-C and USB Power Delivery specifications promulgated by USB IF.

In FIG. 1, BMU 170 may include a charging unit (CU) 174 that may control charging cycles for internal battery 171 and may apply a TOC voltage as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters or other operating parameters received from one or more battery cells in internal battery 171.

In some embodiments, parameters monitored by a BMU 170 may include a charging current, a voltage, a battery impedance, and a temperature associated with internal battery 171. More specifically, the parameters monitored by the BMU 170 may include any or all of the cell configuration and electrochemistry of battery cells within internal battery 171, the total voltage of internal battery 171, the voltages of individual battery cells in internal battery 171, minimum or maximum cell voltages, the average temperature of internal battery 171 as a whole, the temperatures of individual battery cells in internal battery 171, a battery temperature distribution value as described herein, the SOC of internal battery 171, the depth of discharge of internal battery 171, the current flowing into internal battery 171, the current flowing out of internal battery 171, and any other measurement of the overall condition of internal battery 171, in various embodiments. In some embodiments, monitoring the SOC may include continuous or periodic monitoring of output current, voltage, or both for internal battery 171. In some cases, Coulomb counting, in which the charge delivered or stored by a battery is tracked, is used for monitoring of internal battery 171. In some embodiments, a battery temperature may be monitored through the use of periodic voltage measurements, a thermometer, or another type of sensor or method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to power management 185 to implement the methods disclosed herein for selecting and providing a variable battery power output for high resolution display panels, as well as for internal battery management. In some embodiments, power management 185 may be, or include, a power management microcontroller for portable electronics that is designed to select and provide a variable battery power output for high resolution display panels, as described herein. In some embodiments, power management 185 may be, or include, a battery management microcontroller for portable electronics that is designed to accept multiple inputs including, for example, temperature inputs and/or digital data inputs. In some embodiments, the power management methods described herein may take advantage of such hardware, if available in the information handling system. In other embodiments, BMU 170 may be configured to implement internal battery management.

In some embodiments, BMU 170 may calculate additional values, based on the monitored battery parameters or other information obtained from a battery (such as internal battery 171) in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, an operating time since the last charge. In some embodiments, BMU 170, or another component of portable information handling system 100, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or fraction of a discharge capacity remaining that a battery may safely provide electrical power. For example, a remaining battery capacity may be measured in mWh by BMU 170. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof.

In certain embodiments, BMU 170 may include a processor and memory (not shown). The memory may store instructions executable by the processor to perform one or more methods for obtaining and calculating values related to the operation and charging of a battery and for controlling the operation and charging of the battery. The memory may also store data, obtained and calculated values, thresholds, and/or any other parameters related to the methods described herein.

In FIG. 1, charger/booster 172 is shown removably coupled to information handling system 100 via power bus 176. In some embodiments, and in certain circumstances, charger/booster 172 may be configured to supply electrical power for operation of information handling system 100, including for charging internal battery 171. In other circumstances, charger/booster 172 may be configured to receive DC power from internal battery 171 and to boost the voltage of the received DC power to supply electrical power at a higher voltage to display adapter/driver 144 and/or display device 145. For example, in some embodiments, charger/booster 172 may be or include a battery buck-boost charge controller, such as the bq25700A or bq25705A synchronous narrow voltage direct current (NVDC) battery buck-boost charge controllers developed by Texas Instruments Incorporated. These battery buck-boost charge controllers are designed for space-constrained, multi-chemistry battery charging applications that allow the system to be regulated at battery voltage, but not drop below system minimum voltage, even when the battery is completely discharged or removed. Such battery buck-boost charge controllers may be used to charge internal battery 171 from a wide range of input sources including an USB adapter, a high voltage USB power delivery source and a traditional adapter.

During power up, a battery buck-boost charge controller may set the converter to a buck configuration, a boost configuration or a buck-boost configuration based on the input source and on the current battery conditions. The charger may automatically transition between buck, boost and buck-boost configurations without host control. In the absence of an input source, the charger may support an On-the-Go (OTG) function to generate, e.g., by boosting the voltage of the DC power output supplied by internal battery 171 (e.g., a 1- to 4-cell battery), DC power output 173 at 4.48 V to 20.8 V on variable power bus 176. As described in more detail herein, the DC power 173 supplied by charger/booster 172 may, in some cases, be selected and provided to display adapter/driver 144 and/or display device 145. For example, DC power 173 supplied by charger/booster 172 may be selected if and when it is determined that the voltage of the DC power output supplied by internal battery 171 is unsuitable for display adapter/driver 144 and/or display device 145 because display device 145 includes one or more very high definition LCD display panels that consume a much larger percentage of the total power consumed by the information handling system than some standard display devices. For example, in some embodiments, display device 145 may include one or more LCD panels designated as a 4K display panel, an ultra-high-definition (UHD) display panel, or a quad HD (QHD) display panel.

In some embodiments, the techniques described herein for selecting and providing a variable battery power output for high resolution display panels of an information handling system, while supplying power from an internal battery to some or all of the remaining components of the information handling system, may reduce the number of different display/battery pack combinations (each of which may correspond to a different stock keeping unit, or SKU) for which configuration-specific power distribution, voltage boosting, and/or power delivery circuitry is required. For example, in existing systems, the selection of a particular display device that consumes a higher percentage of the total power consumption of a given information handling system than does a standard display offering may limit the battery pack options that can be included in the given system. Conversely, the selection of a particular battery pack in a given information handling system (e.g., one that is selected for its small size) may limit the display devices options that can be included in the given system.

Using the techniques described herein, each of multiple different battery pack configurations, including those with DC output power voltages below 5V, may be paired with multiple different display options, including low resolution display devices up to very high definition display devices. This flexibility may result in reduced costs in terms of a smaller number of SKUs (and a corresponding smaller number of SKU-specific circuit boards or other components) to build and maintain in inventory, less design complexity, and reduced time to market for new combinations of displays and battery packs. In addition, the techniques described herein may lead to more efficient use of space when, for example, the majority of systems do not require DC power that is supplied at a very high voltage, but a relatively small percentage of systems differ from the majority of systems only in that their display devices consume much more power than the majority.

In one example, for a given information handling system platform, 95% of the information handling systems built may be designed to support a total power consumption that is easily supplied by a battery pack with a 2S configuration. The remaining 5% of systems may include high resolution display panels that consume more power than can be reliably or sustainably supplied by the battery pack. Using the techniques described herein, rather than designing the platform to meet the needs of the 5% of systems that include high resolution display panels, the platform may be optimized for the 95% of systems that do not, and the 5% of systems that include the high resolution display panels may be shipped with an external charger/booster (such as charger/booster 172) to provide a variable battery output power for the high resolution display devices rather than with a standard charger or DC power adapter. By coupling information handling systems that include high resolution display devices with an external charger/booster (such as charger/booster 172) and selecting a higher voltage output, a suitable voltage may be provided for each different display panel type (including, in some cases, displays that do not require a boosted voltage). Using these techniques, any battery pack may be able to supply DC power to any display device at a suitable voltage, while supplying the rest of the information handling system with DC power at the native voltage of the battery pack. In this manner, a user may experience desired front-of-screen (FOS) features of a high resolution display device (e.g., in terms of color temperature, color shift, transmission rate, average or peak luminance, etc.) even when the installed battery pack would otherwise be unsuitable. Note that the boost output of the external charger/booster device is not to be confused with a standard USB output port of the charger/booster device. Instead, it is a separate output that, in the systems described herein, is re-tasked for the benefit of the display device only.

Unlike in some existing systems in which a large boost regulator is built into very high definition display devices to allow them to operate with any type of battery pack, making them even more expensive than they would otherwise be, the systems described herein may convert the output voltage of the battery pack at the point of source and then transmit electrical power to the display devices at the higher voltage, which is more efficient. For example, when the voltage of the transmitted power is relatively low, the copper loss is more significant than when the voltage is higher. In some embodiments, the amount of cabling may be reduced when transmitting electrical power at the higher voltage.

FIG. 2 is a block diagram illustrating interactions between selected elements of an embodiment of an information handling system 200 that provides a variable battery power output for high resolution display panels. In the illustrated embodiment, information handling system 200 includes battery pack 210, data storage element 220, state control element 250, switch control element 260, display adapter/driver 270, display device 280, and one or more other system components 240. Information handling system 200 may optionally include charger/booster 230, which may be removably coupled to the system, as described herein.

In some embodiments, battery pack 210 may include an internal battery, such as internal battery 171 illustrated in FIG. 1, and a battery management unit, such as BMU 170 illustrated in FIG. 1. The internal battery within battery pack 210 may include any suitable number of battery cells (e.g., 1, 2, 3, or 4 cells) implemented using various cell configurations and electrochemistries (e.g., one or more S topology types) or combinations of cell configurations and electrochemistries, in different embodiments. The particular battery cells included in the battery pack 210 may vary for different information handling systems. For example, the number, type(s), and/or configuration of cells included in battery pack 210 for a given information handling system may be selected based on a size allocated for battery pack 210, a maximum weight specified for battery pack 210, the costs of various cells, an overall power density requirement for a particular operating context or target applications, an overall power density capability of a particular collection of cells and/or other system level considerations. The DC power output of battery pack 210 is shown in FIG. 2 as V_battery_array 212.

Charger/booster 230 may be similar to charger/booster 172 illustrated in FIG. 1 and described above. In some embodiments, charger/booster 172 may, when coupled to information handling system 200, be considered part of the battery output structure of the system. For example, charger/booster 230 may, at different times and in certain circumstances, be used to charge an internal battery of information handling system 200 (e.g., an internal battery 171 within battery pack 210) or may provide a USB boost output. As decried herein, in some embodiments, charger/booster 230 may be configured to boost the voltage of the DC power output 212 of battery pack 210 to a higher voltage and this higher voltage output may, in some cases, be supplied to display adapter/driver 270, display device 280. In some embodiments, charger/booster 230 may implement a USB boost function but not a charger function. When coupled to information handling system 200, the inputs to charger/booster 230 may include V_battery_array 212. The outputs of charger/booster 230 may include two DC power outputs shown as V_battery 232 and V_boost 234, where V_battery 232 has the same voltage as V_battery_array 212 and V_boost 234 has a higher voltage than V_battery_array 212. In some embodiments, the target voltage for the V_boost 234 power output may be determined dependent on one or more of the battery parameters 214 and/or display parameters 282. For example, the target voltage for the V_boost 234 power output may be determined based on the display type, the state-of-charge of battery pack 210, and/or other battery or display characteristics. In some embodiments, the voltage of the V_boost 234 power output may be dependent on a negotiation (e.g., by power management 185 illustrated in FIG. 1) for a particular USB boost output. The negotiation may be based on any or all of the inputs described herein for selecting and providing a variable battery power output for high resolution display panels, in different embodiments.

Data storage 220 may be configured to store information used in selecting and providing a variable battery power output to display adapter/driver 270 and/or display device 280 when and if display device 280 includes one or more very high definition LCD display panels (e.g., 4K, UHD, or QHD LCD display panels) that consume a much larger percentage of the total power consumed by the information handling system than some standard display devices. For example, data storage 220 may store configuration information for one or more system configurations (e.g., SKUs) including identifiers or other parameters associated with the components included in each of multiple possible SKU configurations. In some embodiments, parameters associated with the components included in each of the possible SKU configurations may be stored in a look-up table 226 in data storage 220. In some embodiments, the information stored in data storage 220 may include battery characteristics and/or display characteristics, such as those described below in reference to battery characteristics 214 and/or display characteristics 282. For example, in some embodiments, characteristics of different display device types that are usable in selecting and providing a variable battery power output to display adapter/driver 270 and/or display device 280 may be stored in look-up table 222 in association with respective Extended Display Identification Data (EDID) values for those display devices. Data storage 220 may also store BIOS parameters 224 indicating, among other things, which of the SKU configurations is implemented in the system. In some embodiments, a determined target voltage for the V_boost 234 power output may be stored in data storage 220. In various embodiments, all or a portion of data storage 220 may be implemented within memory 130 and/or local storage resource 150 illustrated in FIG. 1.

State control 250 may be or include a state machine for controlling the selection of a source of electrical power to be supplied to display adapter/driver 270 and/or display device 280. When charger/booster 230 is not coupled to information handling system 200, state control 250 may select the output of battery pack 210 (shown as V_battery_array 212) as the source of power supplied to display adapter/driver 270 and/or display device 280, as well as to other system components 240 (not shown in FIG. 2). However, when charger/booster 230 is coupled to information handling system 200, state control 250 may control the selection of V_battery 232 or V_boost 234 as the source of electrical power supplied to display adapter/driver 270 and/or display device 280 based on a variety of inputs. For example, the inputs to state control 250 may include battery characteristics 214 and display characteristics 282. One example method for controlling the selection of V_battery 232 or V_boost 234 as the source of electrical power supplied to display adapter/driver 270 and/or display device 280 is illustrated in FIG. 3 and described below.

As illustrated in FIG. 2, battery characteristics 214 may be provided to or obtained by state control 250 from battery pack 210 and may include, for example, any or all of temperature, battery state, battery topology, battery state-ofcharge (SOC), battery state of health (e.g., age), battery size, or other battery characteristics. Display characteristics 282 may be provided to or obtained by state control 250 from display device 280 and may include, for example, any or all of panel type, panel operation state, backlight or brightness settings, resolution settings, or other characteristics of the display panel(s) of display device 280. In some embodiments, display characteristics 282 may include an identifier, such as an EDID value, according to which other characteristics of display device 280 may be determined. In some embodiments, at least some of battery characteristics 214 and/or display characteristics 282 may be retrieved by state control 250 from data storage 220 or may be derived by state control 250 based on information retrieved from data storage 220. Other inputs to state control 250 may include information indicating an operating context of the information handling system and/or the active applications that are currently executing on the information handling system or that are expected to be executing on the information handling system (not shown in FIG. 2).

In the illustrated embodiment, switch control 260 may be configured to select either V_boost 234 or V_battery 234 as the source of electrical power to be supplied to display adapter/driver 270 and/or display device 280 based on the switch control signal 252 output by state control 250. For example, when switch control signal 252 has a first state, V_battery 234 may be selected as the source of electrical power to be supplied to display adapter/driver 270 and/or display device 280. However, when switch control signal 252 has a second state, V_boost 234 may be selected as the source of electrical power to be supplied to display adapter/driver 270 and/or display device 280. In FIG. 2, the output of switch control 260 is shown as DC power output V_display 262, which corresponds to the selected one of the two sources V_boost 234 or V_battery 234. The DC power output V_display 262 may be provided to display adapter/driver 270, which may further boost the voltage of DC power output V_display 262 prior to providing it as DC power 272 to display device 280, or DC power output V_display 262 may be provided directly to display device 280, in different embodiments. For example, in at least some embodiments, the voltage of DC power output V_display 262 may be higher than that of V_battery 234, but may be lower than the operating voltage of display device 280. In such embodiments, a secondary internal boost structure (e.g., within display adapter/driver 270 or elsewhere in the information handling system) may be configured to boost the voltage of DC power output V_display 262 to the operating voltage of display device 280 prior to providing it as DC power 272 to display device 280.

In at least some embodiments, regardless of which of V_boost 234 or V_battery 234 is selected as a source of electrical power to be supplied to display adapter/driver 270 and/or display device 280, the electrical power supplied to some (or all) other system components 240 in information handling system 200 may be the DC power shown as V_battery 232, which is output from charger/booster 230 and has the same voltage as the DC power V_battery_array 212 output by battery pack 210.

In one example embodiment, the native voltage of battery pack 210 (e.g., the voltage of DC power V_battery_array 212 and DC power V_battery 232) may be on the order of 6-8.4 volts, the voltage of the V_boost 234 power output may be on the order of 20 volts, and the operating voltage of display device 280 may be on the order of 40-50 volts. In this example embodiment, because external charger/booster 230 may have already boosted the native voltage of battery pack 210 by a factor of three or more, any secondary internal boost structure (e.g., within display adapter/driver 270 or elsewhere in the information handling system) may only need to apply a 2-to-1 multiplier or a 3-to-1 multiplier to the voltage of V_boost 234 to meet the operating voltage of display device 280. In other embodiments, the operating voltage of display device may be up to 100 volts or even multiple hundreds of volts. Even in these embodiments, the use of external charger/booster 230 may significantly reduce the amount by which any secondary internal boost structure must boost the voltage supplied to the display device.

Referring now to FIG. 3, a block diagram of selected elements of an embodiment of a method 300 for providing a variable battery power output for high resolution display panels in information handling systems, as described herein, is depicted in flowchart form. In various embodiments, method 300 may be performed using portable information handling system 100 (see FIG. 1) and, in particular, by power management 185 within EC controller 180, or by state control element 250 (see FIG. 2). Method 300 may be performed once or repeatedly to select and provide a variable battery power output for different display panels, including high resolution display panels. For example, method 300 may be performed upon power-up and may be repeated if and when an external charger/booster component (such as charger/booster 172 shown in FIG. 1 or charger/booster 230 shown in FIG. 2) is coupled to or uncoupled from the information handling system or there is a change in the state-of-charge of the internal battery (such as internal battery 171) in the information handling system, among other circumstances. It is noted that certain operations described in method 300 may be optional or may be rearranged in different embodiments.

Method 300 may include, at 302, obtaining information indicating one or more characteristics of a display device (such as display device 145 illustrated in FIG. 1 or display device 280 illustrated in FIG. 2) and one or more characteristics of an internal battery of an information handling system (IHS) (such as internal battery 171 illustrated in FIG. 1 or an internal battery within battery pack 210 illustrated in FIG. 2). The information may include, among other characteristics of the display device, an indication of the type of the display device. The information may include, among other characteristics of the internal battery, an indication of the voltage at which DC power is output by the internal battery. The information may include additional characteristics of the display device and/or additional characteristics of the internal battery including, but not limited to, those described herein. Certain elements of the information may be obtained from the display device, the internal battery If, at 304, it is determined, based on the obtained information, that the display device includes a very high definition display panel, such as a 4K, UHD, or QHD type LCD display panel, method 300 may continue at 306. Otherwise, method 300 may proceed to 310.

At 306, the method may include determining a suitable V_display voltage for DC electrical power to be supplied to a display adapter/driver associated with the display device (such as display adapter driver 144 illustrated in FIG. 1 or display adapter/driver 270 illustrated in FIG. 2) or, in other embodiments, to be supplied directly to the display device.

If, at 308, it is determined, based on the obtained information, that the internal battery of the information handling system is the best source for supplying DC power at the determined V_display voltage, method 300 may continue to 310. Otherwise, method 300 may proceed to 312.

At 310, the method may include selecting and configuring DC power output by the internal battery at the native voltage of the internal battery, referred to as V_battery, as the source of electrical power supplied to the display adapter/driver or, in other embodiments, directly to the display device.

At 312, method 300 may include configuring an external boost control structure to boost the internal battery voltage V_battery and generate a DC power output at the determined V_display voltage as an output separate from the V_battery output. In some embodiments, the boost control structure may be implemented by a charger/booster component that is removably coupled to the information handling system, such as charger/booster 172 shown in FIG. 1 or charger/booster 230 shown in FIG. 2.

At 314, the method may include selecting and configuring DC power output by the boost control structure at the determined V_display voltage as the source of electrical power supplied to the display adapter/driver or, in other embodiments, directly to the display device.

At 316, regardless of the DC power output selected as the source of electrical power supplied to the display adapter/driver or directly to the display device, method 300 may include selecting and configuring DC power output by the internal battery at the native voltage of the internal battery, referred to as V_battery, as the source of electrical power supplied to at least some of the remaining components of the information handling system other than display adapter/driver and/or the display device itself. In some embodiments, the electrical power supplied to all components of the information handling system other than those associated with a very high definition display device, if any, may be supplied by the internal battery without first being boosted by the external boost control structure.

While FIG. 3 illustrates an embodiment of a method 300 for providing a variable battery power output for high resolution display panels in information handling systems that include an LCD type display panel, the techniques described herein may also be applied to information handling systems that include display devices of other types that consume large amounts of relative to the total power consumption of the information handling systems to select and provide a boost output at an appropriate voltage higher than the respective native voltages of the internal batteries in the systems.

In FIGS. 1 and 2, the functionality of various components associated with a display device is shown as being partitioned into a display device (such as display device 145 illustrated in FIG. 1 or display device 280 illustrated in FIG. 2) that includes one or more display panels (such as, for example, LCD panels, LED panels, or plasma displays) and a second component (such as display adapter driver 144 illustrated in FIG. 1 or display adapter/driver 270 illustrated in FIG. 2) that includes circuitry and/or logic to implement both a display adapter function and a display driver function. In other embodiments, this functionality may be partitioned differently. In one example, the display device, rather than the display adapter component, may include circuitry and/or logic to implement a display driver function that may, in some cases, be configured to boost the electrical power it receives. In another example, circuitry and/or logic to implement both the display adapter function and the display driver function may be integrated within the display device itself. In several example embodiments described herein, a selection is made indicating whether to supply electrical power at the voltage output by an internal battery or at a boosted voltage to a display adapter/driver component that may, in some cases, be configured to boost the voltage of the received electrical power prior to supplying the electrical power to a display device. In other embodiments, a selection may be made indicating whether to supply electrical power at the voltage output by an internal battery or at a boosted voltage directly to a display device whether or not the display device itself includes driver functionality that, in some cases, may be configured boost the electrical power it receives.

As described herein, an information handling system may implement techniques for providing a variable battery power output for supplying electrical power to high resolution display devices. These techniques may include obtaining characteristics of the display device, including its device type, obtaining characteristics of an internal battery of the information handling system, including a native output voltage of the internal battery, and selecting, based on the obtained characteristics, DC power output by the internal battery (e.g., when the display is a standard or HD display) or a DC power output of an external boost control structure coupled to the information handling system (e.g., when the display is a UHD or QHD display) as the electrical power to be supplied to the display device. The external boost control structure may boost the native voltage of the DC power output by the internal battery to a higher voltage to be supplied to the display device. Electrical power from the selected source may be supplied to the display device while electrical power from the internal battery is supplied to other components of the information handling system. In some embodiments, the external boost control structure may be implemented within a charger/booster device that is removably coupled to the information handling system.

Using the techniques described herein, each of multiple different battery pack configurations may be paired with multiple different display options, including low resolution display devices up to very high definition display devices. This flexibility may result in reduced costs in terms of a smaller number of SKUs (and a corresponding smaller number of SKU-specific circuit boards or other components) to build and maintain in inventory, less design complexity, reduced time to market for new combinations of displays and battery packs, and/or more efficient use of space in the information handling systems, in different embodiments. The techniques described herein may have broad applicability in mobile or other portable devices that source power at a voltage higher than 5 volts and have an internal display that operates at a much higher input voltage.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a display device;
   an internal battery;
   an interface through which an external boost control structure is coupled to the information handling system;
   a processor; and
   a non-transitory computer readable memory media storing instructions executable by the processor for:
   obtaining first information indicating one or more characteristics of the display device, the first information including a type of the display device;

obtaining second information indicating one or more characteristics of the internal battery, the second information including a native voltage of direct current (DC) power output by the internal battery;

selecting, based on the first and second information, a source of electrical power to be supplied to the display device, the selecting including:

selecting the DC power output by the internal battery as the electrical power to be supplied to the display device; or selecting a DC power output of the external boost control structure as the electrical power to be supplied to the display device, the DC power output of the external boost control structure being supplied at a higher voltage than the native voltage of the DC power output by the internal battery;

initiating the supply of electrical power from the selected source of electrical power to the display device; and initiating the supply of electrical power from the internal battery to one or more components of the information handling system other than the display device.

2. The information handling system of claim 1, wherein the external boost control structure is removably coupled to the information handling system.

3. The information handling system of claim 1, wherein the external boost control structure is implemented in an external charger that further comprises circuitry for charging the internal battery.

4. The information handling system of claim 1, wherein to supply the DC power output at a higher voltage than the native voltage of the DC power output by the internal battery, the external boost control structure is configured to receive electrical power from the internal battery at the native voltage and boost the voltage of the received electrical power to the higher voltage.

5. The information handling system of claim 1, wherein:
the type of the display device is an ultra-high-definition liquid crystal display (LCD) device or a quad-high-definition LCD display device; and
selecting the source of electrical power to be supplied to the display device comprises selecting the DC power output of the external boost control structure as the electrical power to be supplied to the display device.

6. The information handling system of claim 1, wherein:
the type of the display device is a standard-definition liquid crystal display (LCD) device or a high-definition LCD display device; and
selecting the source of electrical power to be supplied to the display device comprises selecting the DC power output by the internal battery as the electrical power to be supplied to the display device.

7. The information handling system of claim 1, wherein the instructions are further executable by the processor for:
determining, based on the first and second information, the higher voltage at which the DC power output of the external boost control structure is supplied to the display device.

8. The information handling system of claim 1, wherein:
the higher voltage at which the DC power output of the external boost control structure is supplied to the display device is lower than an operating voltage of the display device; and
the display device comprises an internal boost structure configured to boost the higher voltage at which the DC power output of the external boost control structure is supplied to the display device to the operating voltage of the display device.

9. The information handling system of claim 1, wherein:
the second information further includes at least one of a battery temperature, a battery state, number of cells, a battery topology, a battery state-of-charge, a battery state of health, a battery age, and a battery size; and
the first information further includes at least one of a display panel type, a display panel operation state, a backlight setting, a brightness setting, a resolution setting, and a number of display panels.

10. The information handling system of claim 1, wherein:
the information handling system further comprises a data store; and
at least some of the first information and the second information is obtained from the data store.

11. A method for supplying electrical power to a display device of an information handling system, comprising:
obtaining first information indicating one or more characteristics of the display device, the first information including a type of the display device;
obtaining second information indicating one or more characteristics of an internal battery of the information handling system, the second information including a native voltage of direct current (DC) power output by the internal battery;
selecting, based on the first and second information, a source of electrical power to be supplied to the display device, the selecting including:
selecting the DC power output by the internal battery as the electrical power to be supplied to the display device; or
selecting a DC power output of an external boost control structure coupled to the information handling system as the electrical power to be supplied to the display device, the DC power output of the external boost control structure being at a higher voltage than the native voltage of the DC power output by the internal battery;
supplying electrical power from the selected source of electrical power to the display device; and
supplying electrical power from the internal battery to one or more components of the information handling system other than the display device.

12. The method of claim 11, further comprising:
receiving, by the external boost control structure from the internal battery, DC power at the native voltage of the DC power output by the internal battery; and
boosting, by the external boost control structure, the native voltage of the DC power output by the internal battery to the higher voltage.

13. The method of claim 11, wherein:
the type of the display device is an ultra-high-definition liquid crystal display (LCD) device or a quad-high-definition LCD display device; and
selecting the source of electrical power to be supplied to the display device comprises selecting the DC power output of the external boost control structure as the electrical power to be supplied to the display device.

14. The method of claim 11, wherein:
the type of the display device is a standard-definition liquid crystal display (LCD) device or a high-definition LCD display device; and
selecting the source of electrical power to be supplied to the display device comprises selecting the DC power output by the internal battery as the electrical power to be supplied to the display device.

15. The method of claim 11, further comprising:
determining, based on the first and second information, the higher voltage at which the DC power output of the external boost control structure is supplied to the display device.

16. The method of claim 11, wherein:
the higher voltage at which the DC power output of the external boost control structure is supplied to the display device is lower than an operating voltage of the display device; and
the method further comprises boosting the higher voltage at which the DC power output of the external boost control structure is supplied to the display device to the operating voltage of the display device.

17. The method of claim 11, wherein at least some of the first information or the second information is obtained from a data store of the information handling system.

18. A non-transitory computer readable memory media storing instructions executable by a processor for:
obtaining first information indicating one or more characteristics of a display device of an information handling system, the first information including a type of the display device;
obtaining second information indicating one or more characteristics of an internal battery of the information handling system, the second information including a native voltage of direct current (DC) power output by the internal battery;
selecting, based on the first and second information, a source of electrical power to be supplied to the display device, the selecting including:
selecting the DC power output by the internal battery as the electrical power to be supplied to the display device; or
selecting a DC power output of an external boost control structure coupled to the information handling system as the electrical power to be supplied to the display device, the DC power output of the external boost control structure being at a higher voltage than the native voltage of the DC power output by the internal battery;
initiating the supply of electrical power from the selected source of electrical power to the display device; and
initiating the supply of electrical power from the internal battery to one or more components of the information handling system other than the display device.

19. The non-transitory computer readable memory media of claim 18, wherein:
when the type of the display device is an ultra-high-definition liquid crystal display (LCD) device or a quad-high-definition LCD display device, selecting the source of electrical power to be supplied to the display device comprises selecting the DC power output of the external boost control structure as the electrical power to be supplied to the display device; and
when the type of the display device is a standard-definition liquid crystal display (LCD) device or a high-definition LCD display device, selecting the source of electrical power to be supplied to the display device comprises selecting the DC power output by the internal battery as the electrical power to be supplied to the display device.

20. The non-transitory computer readable memory media of claim 18, wherein the instructions are further executable by the processor for:
determining, based on the first and second information, the higher voltage at which the DC power output of the external boost control structure is supplied to the display device.

\* \* \* \* \*